United States Patent
Wang et al.

(10) Patent No.: US 12,335,171 B2
(45) Date of Patent: Jun. 17, 2025

(54) LOW LATENCY ORTHOGONAL FREQUENCY DIVISION MULTIPLE ACCESS TRANSMISSION SCHEME

(71) Applicant: Apple Inc., Cupertino, CA (US)

(72) Inventors: Xiaowen Wang, Cupertino, CA (US);
Zhengnan Li, Malden, MA (US);
Daniel R. Borges, San Francisco, CA (US); Joseph Hakim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 17/707,587

(22) Filed: Mar. 29, 2022

(65) Prior Publication Data
US 2023/0090911 A1 Mar. 23, 2023

Related U.S. Application Data

(60) Provisional application No. 63/247,591, filed on Sep. 23, 2021.

(51) Int. Cl.
*H04L 5/00* (2006.01)
*H04W 76/14* (2018.01)
*H04W 76/15* (2018.01)

(52) U.S. Cl.
CPC .......... *H04L 5/0007* (2013.01); *H04L 5/0055* (2013.01); *H04W 76/14* (2018.02); *H04W 76/15* (2018.02)

(58) Field of Classification Search
CPC ... H04L 5/0007; H04L 5/0055; H04L 1/1887; H04W 76/14; H04W 76/15; H04W 74/0816
See application file for complete search history.

(56) References Cited

U.S. PATENT DOCUMENTS

| | | | | |
|---|---|---|---|---|
| 11,063,645 | B2* | 7/2021 | Black | H04W 4/70 |
| 2011/0306349 | A1* | 12/2011 | Hakola | H04W 28/04 455/450 |
| 2016/0044724 | A1* | 2/2016 | Seo | H04W 72/0446 370/329 |
| 2020/0100307 | A1* | 3/2020 | Sridhara | H04R 3/12 |
| 2020/0107387 | A1* | 4/2020 | Li | H04L 5/0055 |
| 2021/0218510 | A1* | 7/2021 | Lu | H04W 72/20 |
| 2021/0392545 | A1* | 12/2021 | Ryu | H04W 28/26 |
| 2022/0295581 | A1* | 9/2022 | Batta | H04W 8/005 |
| 2022/0405037 | A1* | 12/2022 | Lee | G09G 3/035 |

(Continued)

FOREIGN PATENT DOCUMENTS

| EP | 2375802 B1 | 12/2016 |
|---|---|---|
| EP | 3148097 B1 | 3/2022 |

*Primary Examiner* — Hashim S Bhatti

(74) *Attorney, Agent, or Firm* — Kowert, Hood, Munyon, Rankin & Goetzel, P.C.

(57) ABSTRACT

This disclosure relates to methods for low latency orthogonal frequency division multiple access communication, according to some embodiments. A wireless device may determine to communicate with another wireless device on a frequency channel as a pair of wireless devices. The wireless device may coordinate with a set of wireless device pairs to share medium access on the frequency channel. The wireless device communicate with the paired wireless device on the frequency channel in a frequency division multiplexing configuration with the set of wireless device pairs.

20 Claims, 8 Drawing Sheets

(56) References Cited

U.S. PATENT DOCUMENTS

| | | | |
|---|---|---|---|
| 2023/0217195 A1* | 7/2023 | Poltorak | H04R 25/606 381/315 |
| 2023/0269012 A1* | 8/2023 | Dong | H04S 1/007 381/311 |
| 2024/0078076 A1* | 3/2024 | Lee | G06F 3/165 |

* cited by examiner

LOW LATENCY ORTHOGONAL FREQUENCY DIVISION MULTIPLE ACCESS TRANSMISSION SCHEME

PRIORITY INFORMATION

This application claims priority to U.S. provisional patent application Ser. No. 63/247,591, entitled "Low Latency Orthogonal Frequency Division Multiple Access Transmission Scheme," filed Sep. 23, 2021, which is hereby incorporated by reference in its entirety as though fully and completely set forth herein.

TECHNICAL FIELD

The present application relates to wireless communication, including techniques and devices for low latency orthogonal frequency division multiple access communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries, or may include wearable forms such as smart watches or wireless earphones, among a great variety of other forms. Some use cases may include UEs being configured to communicate as pairs of devices, for communicating audio data or for any of a variety of other possible reasons. As the range of possible use cases for such paired communication expands, so do the challenges to meeting the needs for those use cases in an efficient and effective manner. Accordingly, improvements in the field are desired.

SUMMARY

Embodiments are presented herein of, inter alia, systems, apparatuses, and methods for devices to perform low latency orthogonal frequency division multiple access communication.

A wireless device may include one or more antennas, one or more radios operably coupled to the one or more antennas, and a processor operably coupled to the one or more radios. The wireless device may be configured to coordinate with another wireless device to communicate as a device pair, for example to communicate audio data. The device pair may further coordinate with other device pairs to form a group of device pairs.

The group of device pairs may negotiate or otherwise determine resource assignments and other communication parameters for the group to support shared orthogonal frequency division multiple access use of the frequency channel by the wireless device pairs of the group.

The shared orthogonal frequency division multiple access use of the frequency channel may include at least some wireless devices in the group contending for medium access at each duty cycle according to a repeating communication configuration. Once a wireless device in the group acquires medium access in a given duty cycle, that wireless device may send out a trigger frame assigning resources (e.g., in accordance with previous negotiations among the devices of the group) of the frequency channel to each wireless device pair in the group, and potentially also for a random access portion of the frequency channel. The wireless devices in the group may then perform wireless communication using their assigned resources in accordance with a configured communication frame structure.

Any modifications to the configuration of the group for subsequent duty cycles may be negotiated using the random access portion of the frequency channel. Wireless devices that wish to join the group, as well as wireless devices already in the group (e.g., that would like to leave the group or negotiate a new configuration), may be able to use the random access resource(s) in this manner. These transmissions may be conducted in a random access order. The new configuration (e.g., including any negotiated device additions or subtractions, modified resource assignments, etc.) may take effect in the next duty cycle after the negotiation is completed. It may be the case that a wireless device that fails an attempt to transmit on the random access resource(s) starts a backoff counter to delay its transmission for a randomly selected duty cycle.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, unmanned aerial vehicles, unmanned aerial controllers, automobiles and/or motorized vehicles, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
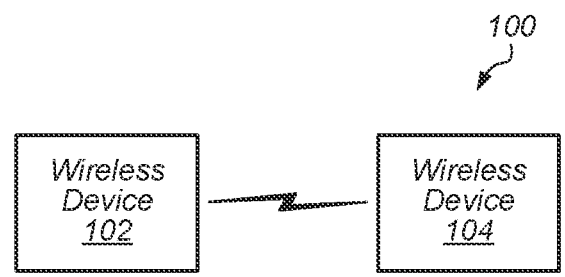
FIGS. 1-2 illustrate exemplary wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device or Station (STA)—any of various types of computer systems or devices that perform wireless communications. A wireless device can be portable (or mobile) or may be stationary or fixed at a certain location. The terms "station" and "STA" are used similarly. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station or Access Point (AP)—The term "Base Station" (also called "eNB") has the full breadth of its ordinary meaning, and at least includes a wireless communication station installed at a fixed location and used to communicate as part of a wireless communication system. The term "access point" is used similarly.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a network infrastructure device. Processors may include, for example: processors and associated memory, circuits such as an ASIC (Application Specific Integrated Circuit), portions or circuits of individual processor cores, entire processor cores, processor arrays, programmable hardware devices such as a field programmable gate array (FPGA), and/or larger portions of systems that include multiple processors, as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, 802.11ad, 802.11ax, 802.11ay, 802.11be, and/or other IEEE 802.11 standards. IEEE 802.11 technology may also be referred to as "Wi-Fi" or "wireless local area network (WLAN)" technology.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
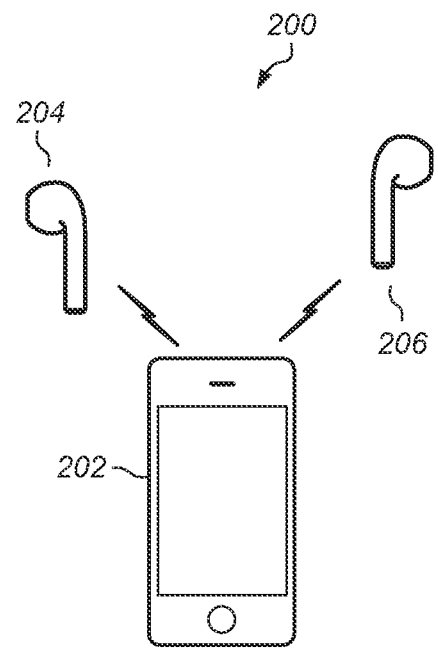

FIGS. 1-2—Communication System

FIG. 1 illustrates an exemplary (and simplified) wireless communication system 100 in which aspects of this disclosure may be implemented. It is noted that the system of FIG. 1 is one possible system, and embodiments of this disclosure may be implemented in any of various systems, as desired. For example, embodiments described herein may be implemented in any type of wireless device. The wireless embodiment described below is one example embodiment.

As shown, the exemplary wireless communication system includes a ("first") wireless device 102 in communication with another ("second") wireless device 104. The first wireless device 102 and the second wireless device 104 may communicate wirelessly using at least one wireless communication technique.

As one possibility, the first wireless device 102 and the second wireless device 104 may communicate using techniques based on Wi-Fi or Bluetooth (BT) wireless communication techniques. In various contexts, the first wireless device 102 may be referred to as a "central" or "primary" device 102 or may be considered a "peer" device 102, while the second wireless device 104 may be referred to as a "peripheral" or "secondary" device 104, or may also be considered another "peer" device 104. One or both of the first wireless device 102 and the second wireless device 104 may also be capable of communicating via one or more additional wireless communication protocols, such as any of Bluetooth Low Energy (also referred to as "BLE"), IEEE 802.11 (Wi-Fi), near field communication (NFC), GSM, UMTS (WCDMA, TDSCDMA), LTE, LTE-Advanced (LTE-A), 5G NR, 3GPP2 CDMA2000 (e.g., 1×RTT, 1×EV-DO, HRPD, eHRPD), GPS, etc.

As shown, as one possibility a single pair of devices may communicate with each other at a particular time. Note that it may also be possible for a wireless device to communicate with multiple peer wireless devices at the same time. The wireless device 102 may be any of a variety of types of devices. As one possibility, the wireless device 102 may be a substantially portable wireless user equipment (UE) device, such as a smart phone, hand-held device, a wearable device, a tablet, or virtually any type of wireless device. As another possibility, the wireless device 102 may be a substantially stationary device, such as a set top box, media player (e.g., an audio or audiovisual device), gaming console, or any of a variety of other types of device.

The wireless device 104 may also be any of various types of devices. Some examples might include hearing aids, headphones, speakers, remote control devices, microphones, headsets, various types of sensors, watches and other wearable computing devices, smart storage cases, etc. In some instances, the wireless device 102 and the wireless device 104 may be the same type of device, such as might be the case for a pair of devices configured to be used together. Note that for devices configured to communicate as a device pair in a hierarchical manner, some devices may be configured to act as either a central/primary device or a peripheral/secondary device, while others may be configured to act only as a central/primary device, or only as a peripheral/secondary device.

Each of the wireless device 102 and the wireless device 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless device 102 and the wireless device 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi (or using communication techniques based at least in part on Bluetooth or Wi-Fi) using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or NR (or LTE or CDMA2000 1×RTT, or LTE or GSM, etc.), and separate radios for communicating using each of Wi-Fi and Bluetooth. Other configurations are also possible.

The wireless device 104 may include one or more microphones and/or one or more speakers, e.g., in order to receive and/or render audio. For example, the wireless device 104 might include one or more microphones for picking up audio in order to provide audio input to the wireless device 102, one or more speakers for rendering audio received as audio output from the wireless device 102, or may include both microphone and speaker for use in conjunction with any of input, output, or bi-directional communication with the wireless device 102. The wireless device 102 may similarly include one or more microphones and/or one or more speakers. Note additionally that aspects of the present disclosure may also be implemented in scenarios in which one or both of the wireless device 102 and the wireless device 104 do not include speakers and/or microphones; for example, while audio data may commonly be communicated using paired wireless communication, any of various other types of data may also or alternatively be communicated using the wireless communication techniques described herein.

As previously noted, aspects of this disclosure may be implemented in conjunction with the wireless communication system of FIG. 1. For example, the wireless devices 102, 104 may be capable of coordinating with a group of wireless device pairs to perform efficient low latency orthogonal frequency division multiple access communication, and one or both of the wireless devices 102, 104 may implement some or all of those features described subsequently herein with respect to FIGS. 5-11. By utilizing such techniques (and/or other techniques described herein), the wireless device(s) may (at least according to some embodiments) be able to efficiently accommodate low latency paired communication use cases, potentially including in relatively congested areas.

As one example of a possible wireless communication system, FIG. 2 illustrates a system 200 in which some or all of a wireless user equipment (UE) device 202 (e.g., a smart phone) and a pair of earbud speaker devices 204, 206 are in communication. In such an exemplary implementation, the UE 202 may provide audio data (e.g., audio from a phone call, voice or video chat application, media player application, or any other audio) as an output audio stream to either or both of the devices 204, 206 via wireless communication as described herein.

Accordingly, one or more of the wireless devices 202, 204, 206, may implement some or all of those features described subsequently herein with respect to FIGS. 5-11, such as performing orthogonal frequency division multiple access communication in a manner that is coordinated with a set of wireless device pairs.

Note that while the exemplary wireless communication systems illustrated in FIGS. 1-2 represent possible scenarios in which aspects of the present disclosure may be implemented, it should be recognized that the techniques described herein may also or alternatively be implemented in a variety of alternate scenarios, in conjunction with a variety of other device combinations, as will be apparent to those skilled in the art.

Figure 3:
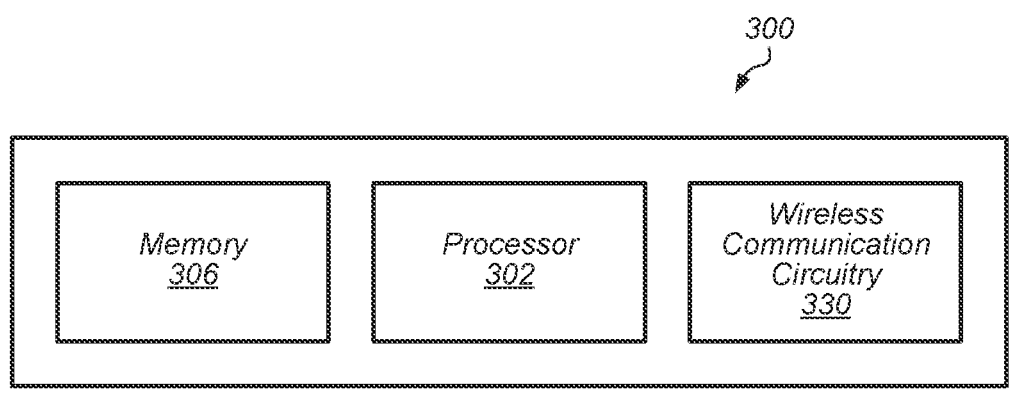
FIGS. 3-4 illustrate exemplary block diagrams of wireless devices.
Figure 4:
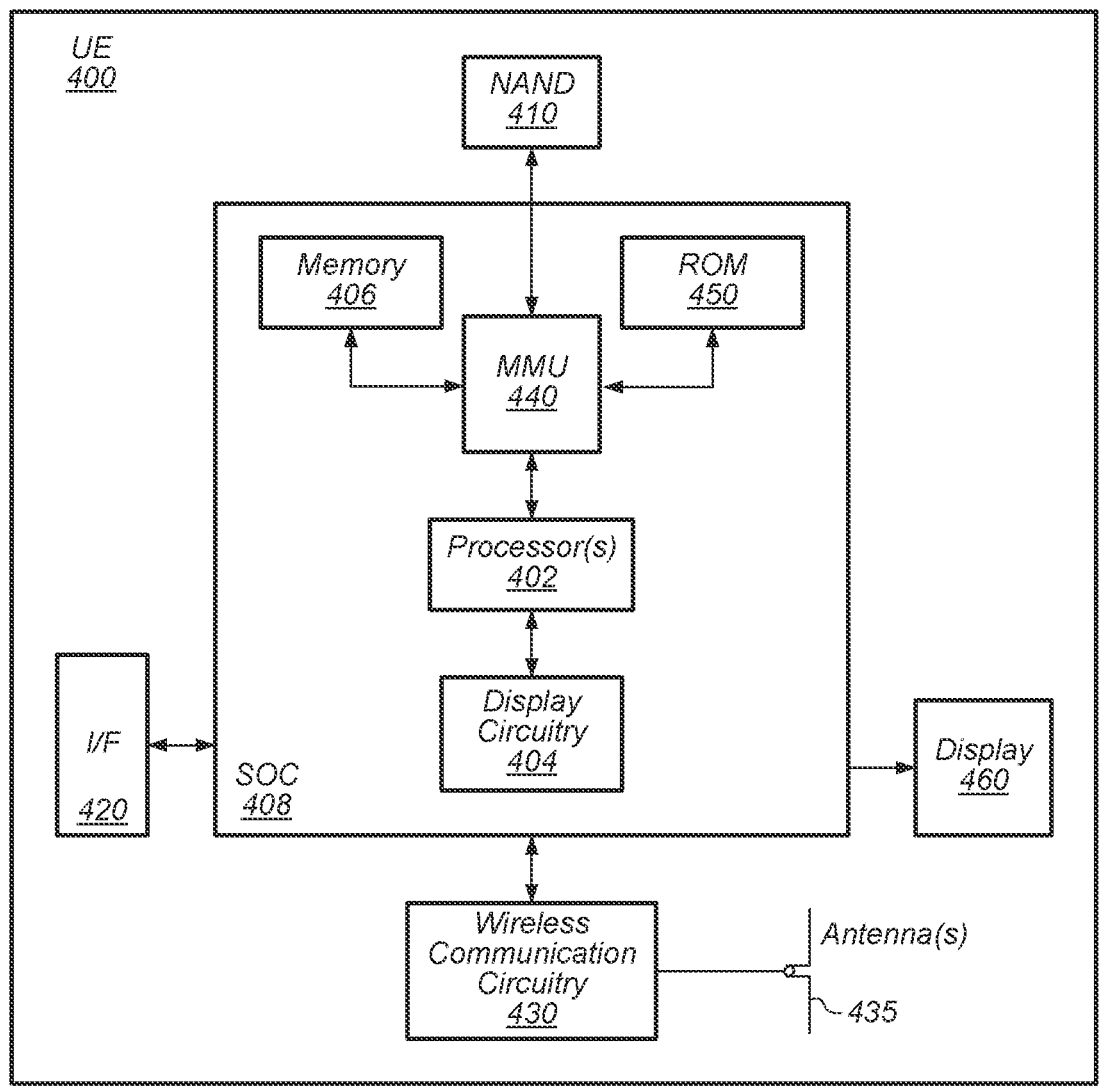

FIGS. 3-4—Exemplary Device Block Diagrams

FIG. 3 illustrates an exemplary wireless device 300 that may be configured for use in conjunction with various aspects of the present disclosure. The device 300 may be any of a variety of types of device and may be configured to perform any of a variety of types of functionality. The device 300 may be a substantially portable device (a mobile device), such as a mobile phone, a personal productivity device, a computer or a tablet, a handheld gaming console, a portable media player, a headphone/earphone, a smart storage device, etc. Alternatively, the device 300 may be a substantially stationary device, such as a desktop computer, set top box, television, or other type of substantially stationary device. The device 300 may be configured to operate as a peer device in a peer-to-peer wireless communication scheme based on IEEE 802.11 wireless communication techniques. In some instances, the device 300 may be configured to operate as a central or primary device in a Bluetooth wireless communication scheme, and/or may be configured to operate as a peripheral or secondary device in a Bluetooth wireless communication scheme.

As shown, the device 300 may include a processing element 302. The processing element may include or be coupled to one or more memory elements. For example, the device 300 may include one or more memory media (e.g., memory 306), which may include any of a variety of types of memory and may serve any of a variety of functions. For example, memory 306 could be RAM serving as a system memory for processing element 302. Other types and functions are also possible.

Additionally, the device 300 may include wireless communication circuitry 330. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 330 may include its own processing element (e.g., a baseband processor), e.g., in addition to the processor 302.

For example, the processor 302 might be an 'application processor' whose primary function may be to support application layer operations in the device 300, while the wireless communication circuitry 330 might be a 'baseband processor' whose primary function may be to support baseband layer operations (e.g., to facilitate wireless communication between the device 300 and other devices) in the device 300. In other words, in some cases the device 300 may include multiple processing elements (e.g., may be a multi-processor device). Other configurations (e.g., instead of or in addition to an application processor/baseband processor configuration) utilizing a multi-processor architecture are also possible.

The device 300 may additionally include any of a variety of other components (not shown) for implementing device functionality, depending on the intended functionality of the device 300, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 300, such as processor 302, memory 306, and wireless communication circuitry 330, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 302, peripheral interfaces for communication with peripheral components within or external to device 300, etc.) may also be provided as part of device 300.

The device 300 (e.g., wireless communication circuitry 330 in conjunction with processor 302, memory 306, and/or other components of device 300) may be configured to implement features for low latency orthogonal frequency division multiple access communication. For example, the wireless device 300 may represent an example of a possible wireless device such as illustrated in any of FIGS. 1-2, and may be capable of low latency orthogonal frequency division multiple access communication and/or implementing other features described herein with respect to FIGS. 5-11.

FIG. 4 is an exemplary block diagram illustrating details of a UE 400, which may be one possible exemplary implementation of the device 300 illustrated in FIG. 3. As shown, the UE 400 may include a system on chip (SOC) 408, which may include portions for various purposes. For example, as shown, the SOC 408 may include processor(s) 402 which may execute program instructions for the UE 400 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As shown, the SOC 408 may be coupled to various other circuits of the UE 400. For example, the UE 400 may include various types of memory (e.g., including NAND flash 410), an interface 420 (e.g., for coupling to a computer system, dock, charging station, etc.), the display 460, and wireless communication circuitry 430 (e.g., for LTE, LTE-A, NR, CDMA2000, Bluetooth, Wi-Fi, GPS, etc.).

The UE 400 may be configured to communicate wirelessly using multiple wireless communication standards. In such instances, the wireless communication circuitry 430 may include radio components which are shared between multiple wireless communication standards and/or radio components which are configured exclusively for use according to a single wireless communication standard. As shown, the UE device 400 may include at least one antenna (and possibly multiple antennas, e.g., for MIMO and/or for implementing different wireless communication technologies, among various possibilities), for performing wireless communication with base stations, access points, and/or other devices. For example, the UE device 400 may use antenna(s) 435 to perform the wireless communication.

The UE 400 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 400 may include hardware and software components for implementing features for low latency orthogonal frequency division multiple access communication. For example, the UE 400 may represent an example of a possible wireless device such as illustrated in any of FIGS. 1-2, and may be capable of performing coordinated low latency orthogonal frequency division multiple access communication and/or implementing other features described herein with respect to FIGS. 5-11. The wireless communication circuitry 430 of the UE device 400 may be configured to implement part or all of the features described herein, e.g., using various circuitry components of the wireless communication circuitry. Alternatively (or in addition), the wireless communication circuitry 430 of the UE device 400, in conjunction with one or more of the other components 402, 404, 406, 408, 410, 420, 435, 440, 450, 460, may be configured to implement part or all of the features described herein, such as the features described herein with reference to any or all of FIGS. 5-11.

FIG. 5—Flowchart

Figure 5:
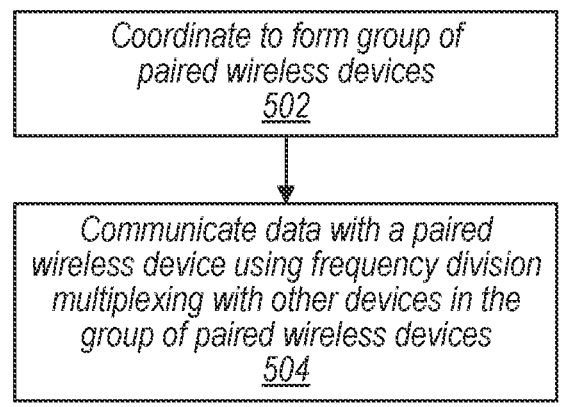
FIG. 5 is a flowchart diagram illustrating an exemplary method for low latency orthogonal frequency division multiple access communication.

FIG. 5 is a flowchart diagram illustrating a method for communication between wireless devices, such as a pair of wireless devices 102, 104, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the wireless devices 102, 104 illustrated in and described with respect to FIG. 1, or more generally in conjunction with any of the computer circuitry, systems, devices, elements, or components shown in the Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with IEEE 802.11 specification documents, such description is not intended to be limiting to the disclosure, and aspects of the method of FIG. 5 may be used in any suitable wireless communication system, as desired. As shown, the method may operate as follows.

A first wireless device may coordinate with other wireless devices to form a group of paired wireless devices (502). The first wireless device may be paired with a second wireless device, e.g., as a first pair of wireless devices. In other words, the first wireless device and the second wireless device may determine to communicate together (e.g., in a peer-to-peer (P2P) or device-to-device (D2D) manner), for example for the purpose of (unidirectionally or bidirectionally) communicating audio data, among various other possible purposes. At least in some instances, one device of the first wireless device pair may be configured as an audio sink device (e.g., a device configured to receive and potentially present audio data) and the other device of the first wireless device pair may be configured as an audio source device (e.g., a device configured to transmit audio data). For example, the first wireless device may be configured as an audio sink device and the second wireless device may be configured as an audio source device, or the first wireless device may be configured as an audio source device and the second wireless device may be configured as an audio sink device. Other pairs of wireless devices in the group of paired wireless devices may form in a similar manner.

The first pair of wireless devices may communicate using orthogonal frequency division multiplexing (OFDM) techniques, for example based at least in part on an IEEE 802.11ax OFDM uplink frame structure, as one possibility. Other wireless communication techniques are also possible. For example, the first wireless device and/or the second wireless device may additionally or alternatively be capable of establishing one or more wireless link(s) using any or all of Bluetooth, Zigbee, near field communication (NFC), and/or any of various other possible short-range communication protocols, according to various embodiments. Additionally, the first wireless device and/or the second wireless device may be capable of performing cellular communication according to 3G, LTE, and/or 5G NR radio access technologies, according to some embodiments. The wireless links may include links in one or more separate frequency bands (e.g., a 2.4 GHz link, a 5 GHz link, a 6 GHz link, and/or other wireless links).

Coordination with the group or set of paired wireless devices may include joining an established group of wireless device pairs, or establishing a new group of wireless device pairs, according to various embodiments. Such coordination may be performed by communicating on a portion of a wireless frequency channel configured by the group of wireless device pairs for random access during channel occupation time acquired by the group of wireless device pairs on the wireless frequency channel.

In a scenario in which the first group of wireless devices is establishing a new group of wireless device pairs, at least as one possibility, the group may initially be formed with just the first wireless device pair. To support the potential for other wireless device pairs to join the group of wireless device pairs, the first wireless device pair may include a portion of the wireless frequency channel used for communication by the first wireless device pair for random access during channel occupation time acquired by the group of wireless device pairs on the wireless frequency channel.

In a scenario in which the first group of wireless devices is joining an existing group of wireless device pairs, the first wireless device may transmit a message indicating that the first pair of wireless devices is joining the group of wireless device pairs, at least as one possibility. The message (or another message, or sequence of messages) may also be used to negotiate resources of the wireless frequency channel to be configured for use by the first pair of wireless devices, for example to communicate with each other during a subsequent channel occupation time acquired by the group of wireless device pairs, and/or to inform the first pair of wireless devices of the resource assignments of other wireless device pairs in the group of wireless device pairs.

Note that according to various embodiments, it may be possible that either or both of the first wireless device and the second wireless device perform coordination with the group of wireless device pairs for the first pair of wireless devices to join or establish the group of wireless device pairs. For example, it may be the case that both the first wireless device and the second wireless device coordinate and each obtain the necessary coordination information (e.g., including resource assignment information and/or any other information coordinated among the group of wireless device pairs) for participation in the group of wireless device pairs. As another possibility, it may be the case that one or the other of the first wireless device and the second wireless device coordinates on behalf of the first pair of wireless devices, and separately informs the other of the first wireless device and the second wireless device of the results of the coordination (e.g., including resource assignment information and/or any other information coordinated among the group of wireless device pairs), for example using another type of wireless link.

As noted, the coordination among the group of wireless device pairs may include establishing resource assignments for each pair of wireless devices in the group of wireless device pairs. In some embodiments, the coordination may additionally or alternatively include negotiating or otherwise determining any of various other types of information (e.g., configuration parameters) for coordinated frequency division multiple access communication by the wireless device pairs of the group. For example, the coordination could include establishing one or more transmit power and/or modulation and coding scheme parameters, for example for one or more of a trigger frame, an initial transmission data frame, a block acknowledgement frame, and/or a retransmission data frame. As another example, the coordination could include establishing a communication frame structure from multiple possible communication frame structure options. Other parameters or details of the coordinated communication may additionally or alternatively be coordinated, as desired. The coordination among the wireless devices of the group may result in each wireless device in the group having sufficient information to contend for medium access and send out a trigger frame initiating and configuring a data communication frame for the group. Alternatively, if desired, it may be possible that only a portion of the wireless devices in the group obtain sufficient information to contend for medium access and send out such a trigger frame, e.g., if only a subset of the wireless devices (e.g., just the audio sink device for each pair, or just the audio source device for each pair, as some possibilities) are expected to contend for medium access.

The first wireless device may communicate data with a paired wireless device (e.g., the second wireless device) using orthogonal frequency division multiple access (OFDMA) communication with other devices in the group of paired wireless devices (504). The coordinated data communication may include sharing of medium access to a frequency channel by the device pairs in the group.

To obtain the medium access to share with the group of wireless device pairs, at least a subset (e.g., the audio sink devices of the device pairs) of the wireless devices in the group may contend for medium access to transmit a trigger frame, which may include performing a listen-before-talk (LBT) procedure and/or any of various other possible carrier sensing multiple access (CSMA) techniques. As previously discussed herein, the trigger frame may include resource assignments for each wireless device pair in the set of wireless device pairs, and/or any of various other information used to configure the set of wireless device pairs to generate and transmit a frequency division multiple access communication frame in a coordinated manner that shares medium access. Once one of the wireless devices obtains medium access, that wireless device may transmit the trigger frame. The other wireless devices in the group that were contending for medium access to transmit the trigger frame may drop the trigger frame transmission upon detecting that the trigger frame for the group has been transmitted. Thus, at least according to some embodiments, the first wireless device may contend for medium access on the frequency channel to transmit the trigger frame, may transmit the trigger frame if medium access is obtained by the first wireless device before the trigger frame is received from another wireless device in the set of wireless device pairs, and drop transmission of the trigger frame if the trigger frame is received from another wireless device in the set of wireless device pairs before medium access is obtained by the first wireless device.

All of the wireless devices in the group of wireless device pairs may receive the trigger frame, and may determine their resource assignments for the communication frame configured by the trigger frame. Note that since reliable reception of the trigger frame by all of the wireless devices in the group (e.g., not just the paired device for the device transmitting the trigger frame) may be required for effective shared use of the communication frame by the group of wireless device pairs, it may be possible that a higher transmit power and/or more robust modulation and coding scheme may be used (e.g., agreed upon by the group of wireless device pairs) for transmitting the trigger frame than for one or more other portions of the communication frame, at least according to some embodiments.

Each wireless device pair may perform communication using the resource assignment indicated by the trigger frame during the communication frame. The communication may include some or all of initial data transmission, acknowledgement transmission, or data retransmission. The data communication may be unidirectional, in some instances. For example, as previously noted, in some instances some or all wireless device pairs may include pairs of audio devices, where one device is configured to act as an audio source and the other device is configured to act as an audio sink. Other types of data, in addition or alternatively to audio data, are also possible.

Thus, at least according to some embodiments, for the initial data transmission, the first wireless device may act as an audio source and may transmit audio data to the second wireless device using resources on the frequency channel configured by the trigger frame for communication by the first pair of wireless devices, while other respective audio source devices in the group transmit audio data to their respective paired audio sink devices using resources on the frequency channel configured by the trigger frame for communication by those respective device pairs. Note that in an alternate configuration, the first wireless device may act as an audio sink and may receive audio data from the second wireless device using resources on the frequency channel configured by the trigger frame for communication by the first pair of wireless devices, similarly while other respective audio source devices in the group transmit audio data to their respective paired audio sink devices using resources on the frequency channel configured by the trigger frame for communication by those respective device pairs.

For the acknowledgement transmission, the device that received the initial data transmission (e.g., the audio sink device) may transmit a block acknowledgement to the device that transmitted the initial data transmission (e.g., the audio source device). The acknowledgement may indicate whether each of one or more portions of the initial data transmission are received successfully. In some instances, acknowledgement (or negative acknowledgement) may not be provided for all portions of the initial data transmission. For example, in some instances, certain portions may be designated higher priority than other portions, and acknowledgement indications may be provided only for the higher priority portions of the initial data transmission. In some instances, a communication frame structure that includes a single instance of each portion of the initial data transmission may be used; in other instances, a communication frame structure that includes repetition of some or all of the portions of the initial data transmission may be used. For example, in some instances (e.g., in response to detection of a relatively high packet error rate (PER), such as a PER above a configured threshold, as one possibility), the group of wireless device pairs may negotiate or otherwise determine to utilize a frame structure in which repetitions of one or more higher priority data portions are included in the initial data transmission. Like the initial data transmission, the block acknowledgement for the first wireless device pair may be transmitted using the resources of the frequency channel assigned for use by the first wireless device pair, and may be performed in a frequency division multiple access configuration in which other wireless devices (e.g., audio sink devices) in the group of wireless device pairs are also transmitting block acknowledgements to their respective paired wireless devices (e.g., audio source devices).

Depending on whether the initial data transmission is considered successful (e.g., as indicated by whether the block acknowledgement indicates successful or unsuccessful reception of the portions for which acknowledgement is provided), the wireless device of the first wireless device pair that performed the initial data transmission may perform a data retransmission. For example, if the first wireless device performs the initial transmission (e.g., if the first wireless device is an audio source), if the block acknowledgement indicates that at least a portion of the data transmitted to the second wireless device is not received successfully, the first wireless device may retransmit data to the second wireless device using the resources on the frequency channel configured by the trigger frame for communication by the first pair of wireless devices, e.g., based at least in part on the block acknowledgement indicating that at least a portion of the data transmitted to the second wireless device is not received successfully. In a scenario in which the first wireless device is the intended receiver of the initial transmission (e.g., if the first wireless device is an audio sink), if the block acknowledgement indicates that at least a portion of the data transmitted to the first wireless device is not received successfully, the first wireless device may receive retransmitted data from the second wireless device using the resources on the frequency channel configured by the trigger frame for communication by the first pair of wireless devices. Note that at least in some instances, it may be possible that a higher transmit power and/or a more robust modulation and coding scheme is agreed upon and used by the wireless devices in the group of wireless device pairs for the data retransmissions than for the initial data transmissions.

As an example, in one set of embodiments, there may be two high priority portions of data communicated in each communication frame, for which acknowledgement indications are provided. In such a scenario, if one of the high priority data portions is successfully received and the other is not successfully received during the initial data transmission, the retransmission may include two repetitions of the high priority data portion that was not successfully received during the initial data transmission. If both of the high priority portions are not successfully received during the initial data transmission, the retransmission may include one instance of each of the high priority data portions. If both of the high priority portions are successfully received during the initial data transmission, retransmission may be skipped. Note that the determination of whether and how to perform retransmission may be performed independently for each pair of wireless devices in the group of wireless device pairs, for example such that the first wireless device pair could perform a retransmission while other wireless device pairs in the group are not performing retransmissions, or vice versa. Each retransmission that is performed by a wireless device pair of the group of wireless device pairs may be performed on the resources assigned to that wireless device pair by the trigger frame, at least according to some embodiments. Note that at least in some embodiments, it may be the case that no acknowledgement frames are provided in response to retransmission frames.

Communication between the first wireless device pair in coordination with the group of wireless device pairs may be performed in a repeating manner, for example in accordance with a configured duty cycle. For example, the process of contending for medium access to transmit the trigger frame and transmitting the trigger frame, performing the initial data transmission, providing the block acknowledgement, and possibly performing the data retransmission, using shared medium access in a frequency division multiplexing manner, may be repeated by the wireless devices of the group of wireless device pairs multiple times at each of multiple regular time intervals. Such a repetitive process may be particularly suited for applications with strict low latency requirements, for example supporting duty cycles as low as 2 ms (or lower, or higher, according to various embodiments), such as might be the case for real time audio data transfer, among various other possible use cases. A reset timer may be used for the communication between each pair of wireless devices to maintain the configured duty cycle. For example, for an audio source, the reset timer may be started when one or more audio packets for a given duty cycle arrive at baseband for the audio source device, and may flush any unsent packets at expiration of the reset timer. For an audio sink, the reset timer may be started when the audio sink device begins attempting to transmit the trigger frame for a given duty cycle, and may deliver any buffered audio packets to the corresponding application if it has not yet done so upon receiving the retransmission frame or upon expiration of the reset timer. For both audio sink and audio source devices, the block acknowledgement window may be moved to account for the new duty cycle upon expiration of the reset timer.

As previously noted herein, group coordination may be performed at least in part using a portion of the frequency channel used by the group of wireless device pairs that is configured for random access. The resource assignment of the portion of the frequency channel used for random access may be configured by the trigger frame. The resources of the frequency channel configured for the random access communication may be frequency division multiplexed and time synchronous with the resources of the frequency channel configured for communication by the first pair of wireless devices and the other pairs of wireless devices of the group of wireless device pairs. Any negotiations (e.g., additions or removals of wireless device pairs to or from the group, changes to communication frame structure, transmit power parameters, modulation and coding scheme configuration, resource assignment modifications, etc.) performed by wireless devices of the group of wireless device pairs using the random access resources may be applied for the subsequent duty cycle. For example, the trigger frame for the subsequent duty cycle may reflect the parameters and/or other communication characteristics negotiated or otherwise determined using the random access resources of a given duty cycle, at least as one possibility.

Note that it may be the case that the random access resource(s) can be contended for by new wireless devices (e.g., that wish to join the group) as well as by wireless devices that are already in the group. If a wireless device fails an attempt to transmit on the random access resource (s), the wireless device may start a backoff counter to delay its transmission for a randomly selected duty cycle, at least according to some embodiments.

Thus, according to the method of FIG. 5, it may be possible for multiple pairs of wireless devices to coordinate to efficiently utilize a wireless medium to simultaneously perform low latency orthogonal frequency division multiple access communication. In comparison to techniques in which such pairs of devices contended for medium access and performed their communications independently, such techniques may potentially improve the latency for communications performed between each pair of wireless devices in the group. Further, such techniques may reduce total demand for wireless medium resources due to reduced signaling overhead and increased medium use efficiency, thereby potentially improving medium access availability to all wireless devices sharing the medium, among various possible benefits, at least according to some embodiments.

FIGS. 6-11 and Additional Information

FIGS. 6-11 illustrate further aspects that might be used in conjunction with the method of FIG. 5 if desired. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

Figure 6:
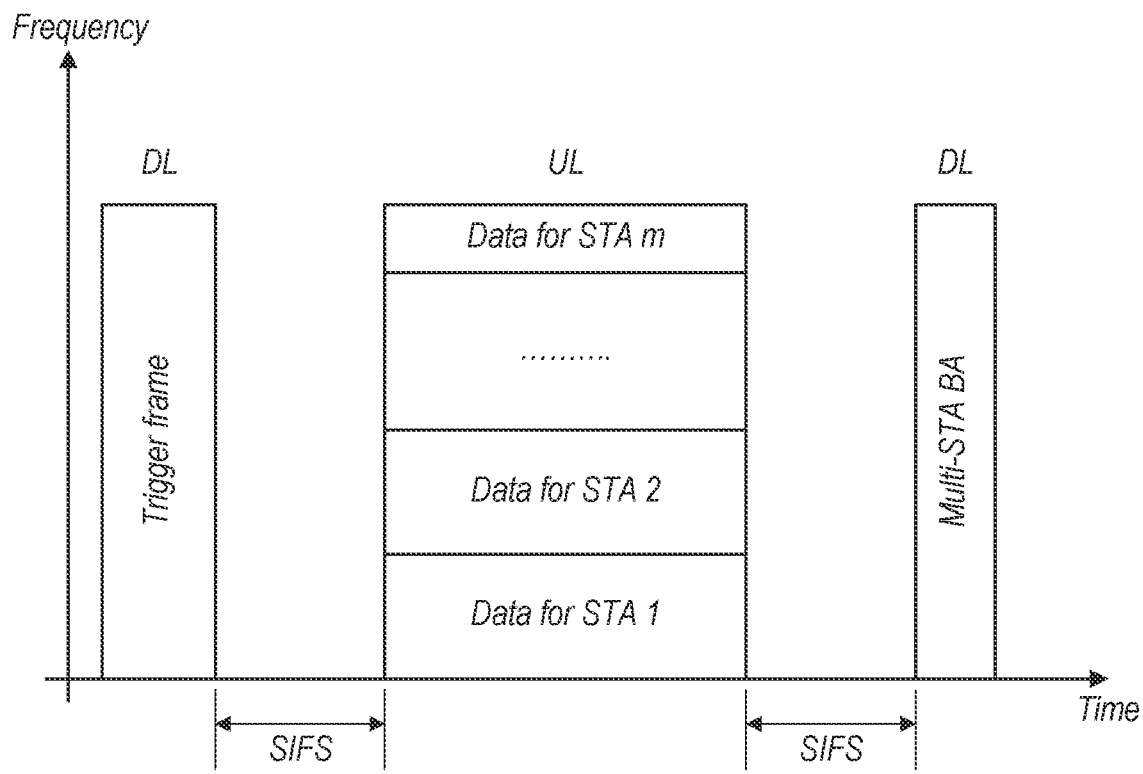
FIG. 6 illustrates exemplary aspects of a possible uplink orthogonal frequency division multiple access communication scheme.

IEEE 802.11 protocols, e.g., IEEE 802.11ax, include support for orthogonal frequency division multiple access (OFDMA) communication, which allows multiple users to transmit simultaneously using different frequency resource units (RUs). FIG. 6 is a time-frequency diagram illustrating example aspects of such possible communication, according to some embodiments. As shown, an access point (AP) may send a trigger frame in the downlink to stations (STAs), which may indicate the RU allocation and transmit opportunity (TxOP) for the uplink transmission being scheduled by the trigger frame. Each of these STAs may send an uplink high efficiency (HE) trigger based (TB) frame to the AP in an OFDMA fashion using the configuration indicated in the trigger frame. The AP may then send back a multi-STA block acknowledgement (BA) to these STAs in a downlink HE multi-user frame, also in OFDMA fashion.

Figure 7:
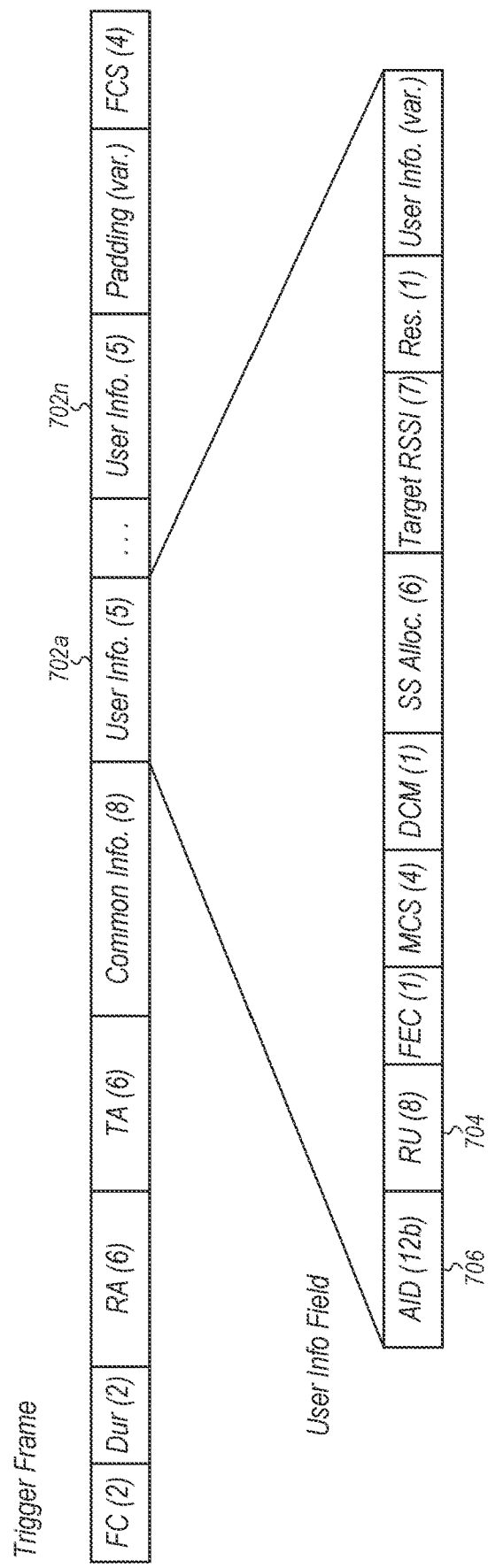
FIG. 7 illustrates exemplary aspects of a trigger frame that could be used for an orthogonal frequency division multiple access communication.

FIG. 7 illustrates aspects of an example trigger frame that could be used in conjunction with the OFDMA communication scheme of FIG. 6. As shown, the trigger frame may contain a (e.g., arbitrary, possibly up to a configured maximum) number of user information fields 702a-702n, each of which may contain resource allocation information (e.g., in the RU 704 subfield) for a STA (e.g., identified in the AID 706 subfield) to which the AP is assigning uplink HE TB frames. Note that any number of variations or alternatives to the illustrated example trigger frame could be used in accordance with various embodiments of this disclosure, as desired.

Figure 8:
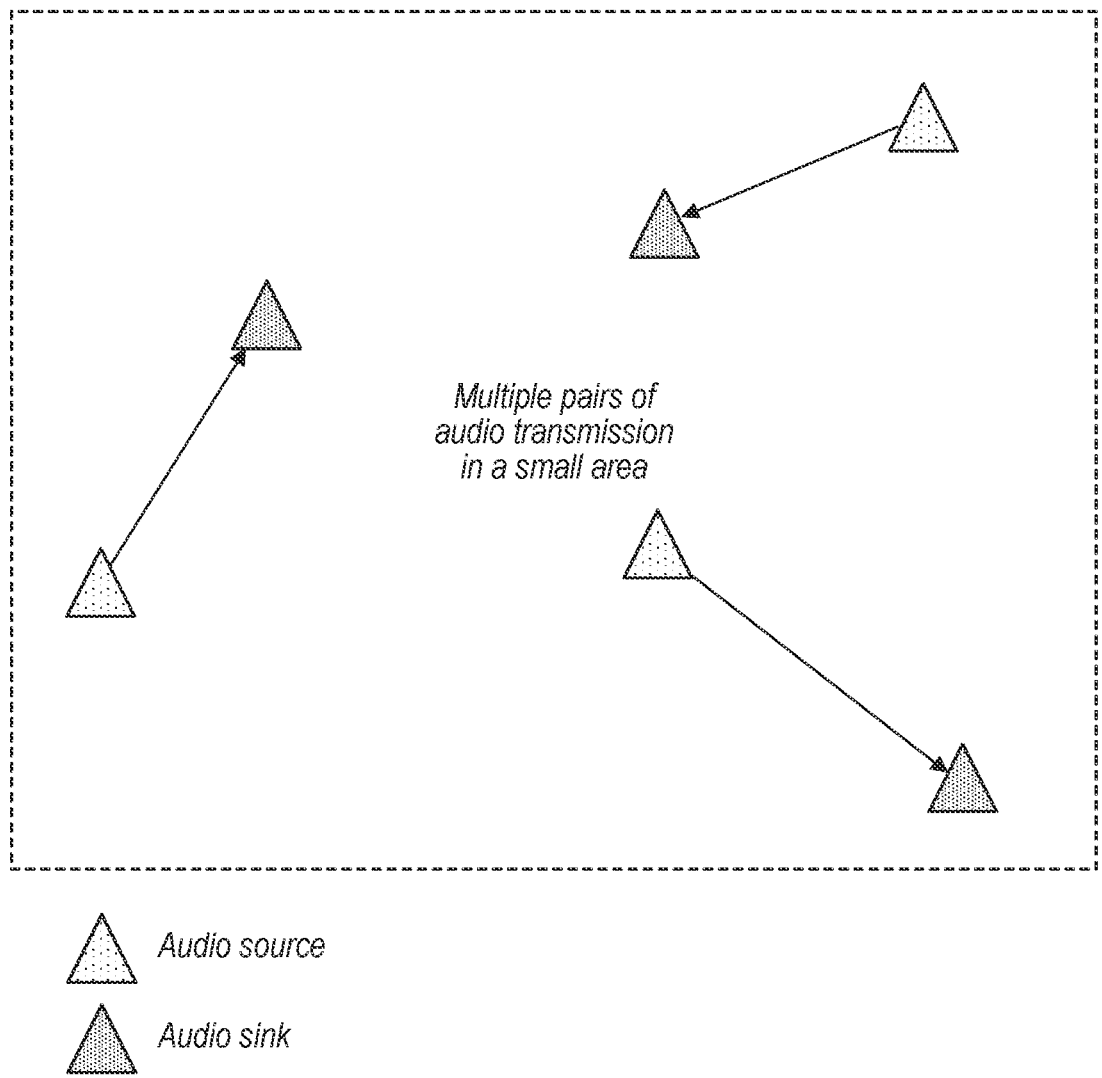
FIG. 8 illustrates exemplary aspects of a possible wireless communication system including multiple pairs of audio sources and audio sinks, according to some embodiments.

FIG. 8 illustrates aspects of an example scenario in which multiple pairs of wireless devices (e.g., with each pair including a device acting as an audio source and a device acting as an audio sink) wishing to perform low latency audio transmissions are present in a relatively small area. In such a scenario, in order to minimize end-to-end latency, a relatively small audio packet duty cycle may be used (e.g., 2 ms instead of 20 ms or 40 ms). Such a short duty cycle may result in a relatively small amount of data being included in each transmission, which may magnify the impact of overhead on the overall packet size. The impact may vary depending on the wireless communication scheme being employed. For example, the impact may be relatively large if wireless communication using existing Wi-Fi techniques is performed. In such a system, it may also be important for audio packets to be delivered reliably (e.g., with a packet error rate (PER) of less than 1%, as one possibility), for example in order to avoid perceivable degradation in audio quality. However, the low latency requirement and short duty cycle in this example use case may leave limited opportunity for retransmissions.

Figure 9:
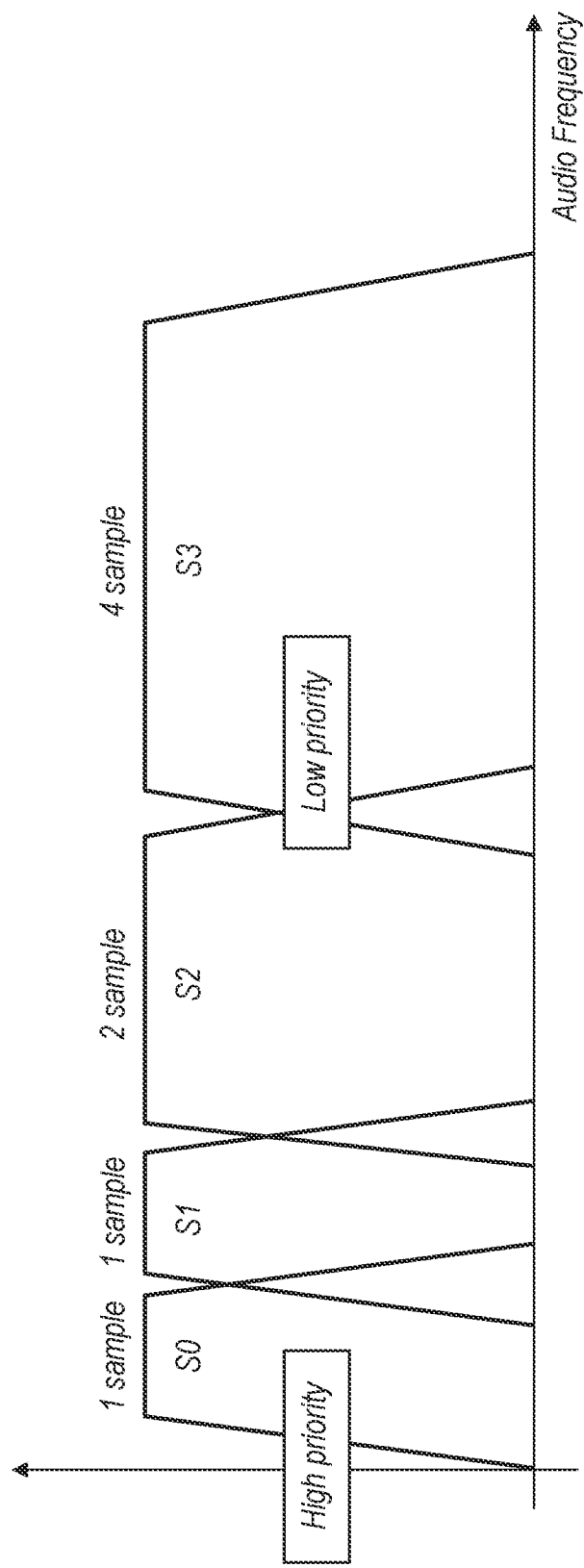
FIG. 9 illustrates exemplary aspects of a possible audio codec framework.

FIG. 9 illustrates aspects of a joint source channel coding (JSCC) audio codec that could be used in conjunction with a low latency audio wireless communication scenario, such as in the scenario illustrated in FIG. 8. As shown, in the illustrated example, 4 streams may be configured, including 2 high priority streams (S0 and S1, each including 1 sample) and 2 low priority streams (S2, including 2 samples, and S3, including 4 samples). As an example, a sampling frequency of 48 KHz, 16 bits per sample, may be used, such that in 2 ms, streams S0 and S1 include 48 bytes, stream S2 includes 96 bytes, and stream 3 includes 192 bytes. Minimal performance may be guaranteed using such a codec with high priority streams only, at least according to some embodiments. The bandwidth requirement to wirelessly transmit audio data using such a codec may vary based at least in part on radio conditions.

In consideration of the particular characteristics of such a low latency audio communication use case, it may be beneficial to provide a new transport protocol to carry such JSCC audio data, and/or other data with low latency and short duty cycle characteristics. Such transport may be capable of supporting reliable low latency audio delivery in a small congested area with multiple instances of the same audio application (or possibly multiple audio applications using the same transport protocol) being active at the same time. It may further be possible to provide such a transport mechanism in a manner that can potentially reduce medium utilization, for example by supporting coordinated multi-user communication that can reduce the number of devices contending for independent medium access based on the number of users coordinating to perform the multi-user communication.

Figure 10:
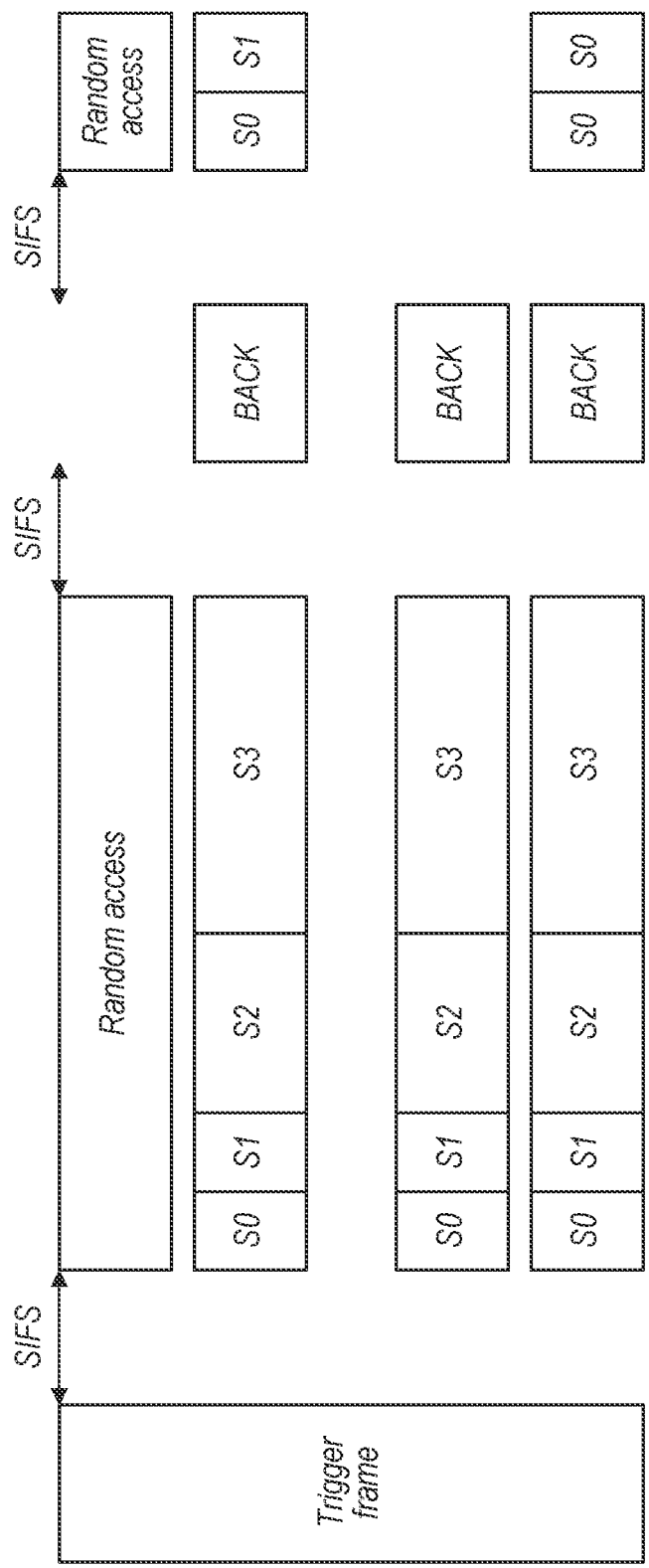
FIG. 10 illustrates exemplary aspects of a possible low latency orthogonal frequency division multiple access communication scheme.

FIG. 10 is a time-frequency diagram illustrating example aspects of such a possible low latency multi-user communication scheme, according to some embodiments. In the illustrated scenario, one or more audio sink devices may compete for medium access, and one of those audio sink devices that obtains medium access may send out a trigger frame. The trigger frame may contain RU allocation information for all audio pairs in a coordinated group of audio pairs. The audio source devices in the coordinated group may send out audio frames in a TB frame to their corresponding audio sink devices in the coordinated group according to the resource allocation assigned in the trigger frame. All of the audio streams may be aggregated to one aggregated media access control (MAC) protocol data unit (AMPDU). The audio sink devices may send out block ACKs (BACKs) to their corresponding audio source devices using the trigger based frame. One retransmission may be scheduled after the BACK. Only stream 0 and stream 1 are allowed to be retransmitted, in the illustrated scheme. Audio sources do not retransmit if S0 and S1 are received successfully. The retransmission may use the TB frame, the duration of which may cover retransmission of both S0 and S1. If only one stream needs retransmission, the audio source may repeat that stream to fill the TB frame, for example instead of padding dummy bits.

As also shown, the trigger frame may provide a portion of the resources of the wireless medium for random access, which may be used by audio pairs to negotiate with each other. Such negotiation may include coordinating to determine when an audio pair joins the coordinated group of audio pairs, when an audio pair leaves the coordinated group of audio pairs, to negotiate or otherwise determine resource assignments and/or global distribution of resources (e.g., for future frames), to determine transport characteristics such as transmit power and/or modulation and coding scheme (MCS) for various portions of the transport mechanism, and/or for any of various other possible purposes.

Once such setup is complete, at every codec duty cycle (e.g., 2 ms, as in the previously provided example, or any of various other possible lengths), all audio pairs participating in the coordinated group may repeat the communication scheme to communicate the audio data for that duty cycle. The communication scheme may also be modified as needed to account for changes in setup negotiated using the random access resources, such as modifying resource assignments to accommodate an existing member audio pair leaving the group or a new audio pair joining the group, or to modify the transmit power configuration or the MCS configuration for the next TB frame in view of changes in wireless medium conditions, among various possibilities.

In more detail, at every codec duty cycle, audio sink devices of the group may start to compete for the medium to send out the trigger frame. All participating sinks may be trying to send the same trigger frame, for example that may include parameters negotiated using the random access resources during a previous codec duty cycle. The trigger frame may contain the RU allocations of all participating audio pairs. After one audio sink successfully sends out the trigger frame, the other audio sinks in the group may drop the trigger frame transmission and adjust their own PHY settings corresponding to their respective peer RU information.

Upon receiving the trigger frame, the participating audio source devices of the group may start to send audio data using a HE TB frame in accordance with the RU and MCS allocation specified in the trigger frame. All streams of the audio codec output may be aggregated to an AMPDU. The destination address of the AMPDU may be set to the corresponding audio sink in the audio pair (e.g., instead of the source address of the trigger frame, such as in the 802.11ax communication scheme illustrated in FIG. 6). The TxOP may protect the communication until block ACK reception.

Upon the end of the scheduled uplink TB frame duration, the audio sinks may prepare and sent out a block ACK to the audio sources, after a short interframe space (SIFS). The block ACKs may also be carried using the HE TB frame, for example to allow all the participating audio sinks to transmit simultaneously. The block ACK frames may use the same RU resources as specified in the previous trigger frame.

Upon receiving the block ACK, the audio sources can send out another round of retransmission also using the same HE TB frame. Based on the transmission success or failure, the audio source may or may not retransmit. For example, an audio source that received acknowledgement that the high priority streams are received correctly may determine to not send any retransmission. If no retransmission is needed for all participating audio pairs, the medium may automatically be released after the block ACK. An audio source that lost any of the high priority streams can send the lost stream(s) again. The participating audio pairs can negotiate that a lower MCS is used for such retransmission, if desired. The retransmission duration may be based on the negotiated MCS. The retransmission frame may provide for transmission of two high priority streams, such that an audio source that lost just one stream repeats the lost stream to fill the entire retransmission duration.

A reset timer may be used at both the audio source device and the audio sink device of each audio pair. The audio source may start the reset timer when the audio packet for the duty cycle arrives at baseband. The audio sink may start the reset timer when it starts the attempt to transmit the trigger frame for the duty cycle. Upon receiving the retransmission frame or at expiration of the reset timer, the audio source may flush any unsent packets and prepare to send the next audio frame. The block ACK window may be moved accordingly. The audio sink may deliver any buffered audio packets to the application if it has not yet done so. The block ACK window may also be moved accordingly. It may be the case that no ACK frame is sent to respond to the retransmission. After such reset occurs, all participating audio pairs may repeat the process for the new duty cycle.

Note that such a transport protocol may rely significantly on successful reception of the trigger frame by all participating audio pairs. Accordingly, if desired, it may be possible to coordinate or negotiate a higher transmit power level and/or a lower (more robust) MCS for the trigger frame operation than for some or all other portions of the communication scheme, at least according to some embodiments.

At least in some instances, audio sink devices participating in such a communication scheme may hold packets at MAC until after the retransmission and forward the received audio streams to the codec in order at that time.

Figure 11:
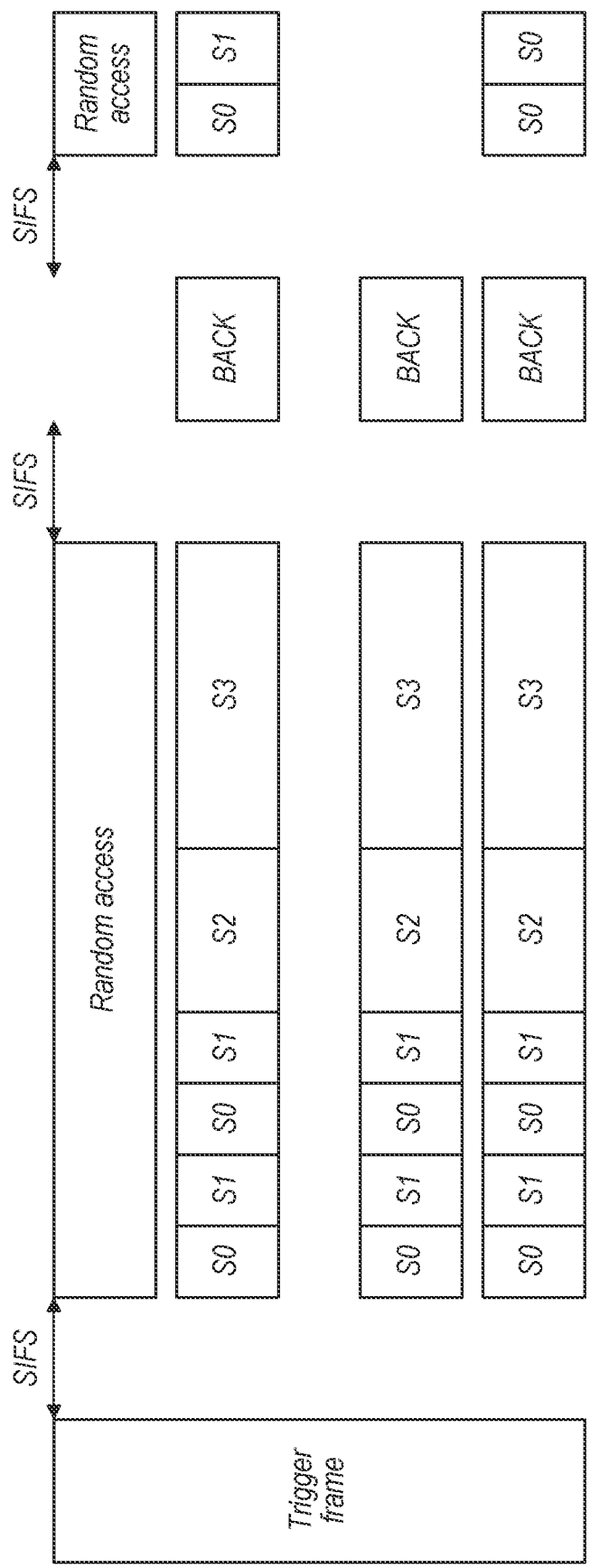
FIG. 11 illustrates exemplary aspects of another possible low latency orthogonal frequency division multiple access communication scheme.

In some embodiments, an alternative frame structure may be used, for example to further prioritize the high priority streams S0 and S1. FIG. 11 illustrates aspects of one such example alternative frame structure. In the illustrated example, repetitive transmission on high priority streams is directly applied in the first transmission. As shown, retransmission of the high priority streams may still be supported in the illustrated frame structure in addition to the additional repetitions in the initial transmission, to provide further robustness for the high priority streams. Such a scheme could be used, for example, when it is determined that initial packet error rate (PER) is high, at least as one possibility.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., an AP 104 or a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first wireless device, comprising:
an antenna;
a radio communicatively coupled to the antenna; and
a processor operably coupled to the radio;
wherein the first wireless device is configured to:
determine to communicate with a second wireless device on a frequency channel as a first pair of wireless devices;
coordinate with a set of wireless device pairs to share access to the frequency channel, wherein the set of wireless device pairs includes at least a second pair of wireless devices;

communicate with the second wireless device on the frequency channel, including establishing a frequency division multiplexing arrangement with the set of wireless device pairs; and contend for access to the frequency channel to transmit a trigger frame indicating resource assignments for at least one other wireless device pair in the set of wireless device pairs.

2. The first wireless device of claim 1, wherein the first wireless device is further configured to:

determine to transmit the trigger frame when access to the frequency channel is obtained by the first wireless device before a second trigger frame is received from another wireless device in the set of wireless device pairs; and determine not to transmit the trigger frame when the second trigger frame is received before access to the frequency channel is obtained by the first wireless device.

3. The first wireless device of claim 1, wherein the first wireless device acts as an audio source in the first pair of wireless devices, wherein to communicate with the second wireless device on the frequency channel, the first wireless device is further configured to:

transmit audio data to the second wireless device using resources on the frequency channel configured by a trigger frame for communication by the first pair of wireless devices; and receive a block acknowledgement from the second wireless device using the resources on the frequency channel configured by the trigger frame for communication by the first pair of wireless devices.

4. The first wireless device of claim 3, wherein the block acknowledgement indicates that at least a portion of the audio data transmitted to the second wireless device is not received successfully, wherein the first wireless device is further configured to:

retransmit audio data to the second wireless device using the resources on the frequency channel configured by the trigger frame for communication by the first pair of wireless devices based at least in part on the block acknowledgement indicating that at least a portion of the audio data transmitted to the second wireless device is not received successfully.

5. The first wireless device of claim 1, wherein the first wireless device acts as an audio sink in the first pair of wireless devices, wherein the first wireless device is further configured to:

receive audio data from the second wireless device using resources on the frequency channel configured by a trigger frame for communication by the first pair of wireless devices; and transmit a block acknowledgement to the second wireless device using the resources on the frequency channel configured by the trigger frame for communication by the first pair of wireless devices.

6. The first wireless device of claim 5, wherein the block acknowledgement indicates that at least a portion of the audio data from the second wireless device is not received successfully, wherein the first wireless device is further configured to:

receive retransmitted audio data from the second wireless device using the resources on the frequency channel configured by the trigger frame for communication by the first pair of wireless devices based at least in part on the block acknowledgement indicating that at least a portion of the audio data from the second wireless device is not received successfully.

7. The first wireless device of claim 1, wherein the first wireless device is further configured to:

communicate with the second wireless device on the frequency channel in the frequency division multiplexing arrangement with the set of wireless device pairs in a repeating manner in accordance with a configured duty cycle; and utilize a reset timer for the communication with the second wireless device on the frequency channel as the first pair of wireless devices to maintain the configured duty cycle.

8. The first wireless device of claim 1, wherein coordinating with the set of wireless device pairs to share access to the frequency channel comprises at least one of:

determining frequency division multiplexing resource assignments for each wireless device pair in the set of wireless device pairs;

determining a frequency division multiplexing resource assignment for a random access portion of the frequency channel;

determining a communication frame structure; or determining one or more of a transmission power or a modulation and coding scheme configuration for one or more of a trigger frame, a data frame, a block acknowledgement frame, or a retransmission frame.

9. A method, comprising:

by a first wireless device:

determining to communicate with a second wireless device on a frequency channel as a first pair of wireless devices;

contending for access to the frequency channel to send a trigger frame in a coordinated manner with a set of wireless device pairs, wherein the trigger frame indicates resource assignments for each wireless device pair in the set of wireless device pairs;

receiving data from the second wireless device on the frequency channel using resources configured by the trigger frame; and transmitting a block acknowledgement to the second wireless device using resources configured by the trigger frame.

10. The method of claim 9, wherein the method further comprises:

transmitting the trigger frame if medium access is obtained by the first wireless device before the trigger frame is received from another wireless device in the set of wireless device pairs; and dropping transmission of the trigger frame if the trigger frame is received from another wireless device in the set of wireless device pairs before medium access is obtained by the first wireless device.

11. The method of claim 9, wherein the block acknowledgement indicates that at least a portion of the data from the second wireless device is not received successfully, wherein the method further comprises:

receiving retransmitted data from the second wireless device on the frequency channel using resources configured by the trigger frame, wherein the retransmitted data is received from the second wireless device based at least in part on the block acknowledgement indicating that at least a portion of the data from the second wireless device is not received successfully.

12. The method of claim 9,
wherein the trigger frame also configures resources on the frequency channel for communication by a second pair of wireless devices in the set of wireless device pairs, wherein the resources on the frequency channel configured for communication by the second pair of wireless devices are frequency division multiplexed and time synchronous with the resources on the frequency channel configured for communication by the first pair of wireless devices.

13. The method of claim 9,
wherein the trigger frame also configures resources on the frequency channel for random access communication, wherein the resources on the frequency channel configured for random access communication are frequency division multiplexed and time synchronous with the resources on the frequency channel configured for communication by the first pair of wireless devices.

14. The method of claim 9,
wherein determining to communicate with the second wireless device on the frequency channel as the first pair of wireless devices further comprises coordinating to communicate audio data with the first wireless device acting as an audio sink and the second wireless device acting as an audio source.

15. A baseband processor of a first wireless device, wherein the baseband processor is configured to perform operations comprising:
determining to communicate with a second wireless device on a frequency channel as a first pair of wireless devices;
receiving a trigger frame on the frequency channel, wherein the trigger frame configures resources on the frequency channel for communication by each wireless device pair of a set of wireless device pairs that includes the first pair of wireless devices;
transmitting data to the second wireless device using resources on the frequency channel configured by the trigger frame for communication by the first pair of wireless devices; and
receiving a block acknowledgement from the second wireless device using resources on the frequency channel configured by the trigger frame for communication by the first pair of wireless devices.

16. The baseband processor of claim 15, wherein the block acknowledgement indicates that at least a portion of the data transmitted to the second wireless device is not received successfully, wherein the baseband processor is further configured to perform operations comprising:
retransmitting data to the second wireless device using the resources on the frequency channel configured by the trigger frame for communication by the first pair of wireless devices based at least in part on the block acknowledgement indicating that at least a portion of the data transmitted to the second wireless device is not received successfully.

17. The baseband processor of claim 16,
wherein retransmitting data to the second wireless device is performed using a more robust modulation and coding scheme than initially transmitting data to the second wireless device.

18. The baseband processor of claim 15,
wherein the resources on the frequency channel configured for communication by each wireless device pair in the set of wireless device pairs are frequency division multiplexed and time synchronous with the resources on the frequency channel configured for communication by each other wireless device pair in the set of wireless device pairs.

19. The baseband processor of claim 15,
wherein the trigger frame also configures resources on the frequency channel for random access communication for the set of wireless device pairs, wherein the resources on the frequency channel configured for random access communication for the set of wireless device pairs are frequency division multiplexed and time synchronous with the resources on the frequency channel configured for communication by each wireless device pair in the set of wireless device pairs.

20. The baseband processor of claim 15,
wherein determining to communicate with the second wireless device on the frequency channel as the first pair of wireless devices further comprises coordinating to communicate audio data with the first wireless device acting as an audio source and the second wireless device acting as an audio sink.

* * * * *